(12) United States Patent
Meckler et al.

(10) Patent No.: US 7,038,562 B1
(45) Date of Patent: May 2, 2006

(54) SIMULATION SWITCH

(75) Inventors: Peter Meckler, Hohenstadt/Pommelsbrunn (DE); Ewald Schneider, Offenhausen (DE); Gerd Abraham, Burgthann (DE)

(73) Assignee: Ellenberger & Poensgen, Altdorf (DE)

( * ) Notice: Subject to any disclaimer, the term of this patent is extended or adjusted under 35 U.S.C. 154(b) by 181 days.

(21) Appl. No.: 10/149,817

(22) PCT Filed: Nov. 23, 2000

(86) PCT No.: PCT/EP00/11668

§ 371 (c)(1),
(2), (4) Date: Sep. 18, 2002

(87) PCT Pub. No.: WO01/45129

PCT Pub. Date: Jun. 21, 2001

(30) Foreign Application Priority Data

Dec. 16, 1999 (DE) ............................... 199 60 755

(51) Int. Cl.
*H01H 83/00* (2006.01)

(52) U.S. Cl. ............................. 335/20; 335/6
(58) Field of Classification Search ............. 335/6, 335/14, 18, 20, 185–190, 128; 361/93.1; 434/45

See application file for complete search history.

(56) References Cited

U.S. PATENT DOCUMENTS

| 2,912,546 | A | | 11/1959 | Arey ......................... 200/116 |
|---|---|---|---|---|
| 3,156,849 | A | | 11/1964 | Epstein ....................... 317/27 |
| 4,215,328 | A | * | 7/1980 | Chabot et al. ................. 335/6 |
| 4,329,669 | A | * | 5/1982 | Krasser et al. ............... 335/20 |
| 4,491,812 | A | * | 1/1985 | Happach ..................... 335/184 |
| 4,636,760 | A | * | 1/1987 | Lee ............................. 335/14 |
| 5,381,121 | A | | 1/1995 | Peter et al. ................... 335/20 |
| 5,694,280 | A | * | 12/1997 | Zhou .......................... 335/18 |
| 5,838,219 | A | * | 11/1998 | Du et al. ...................... 335/14 |
| 5,986,528 | A | * | 11/1999 | Meier et al. ................... 335/6 |
| 6,211,757 | B1 | * | 4/2001 | Castonguay et al. ........... 335/6 |
| 6,255,925 | B1 | * | 7/2001 | DiMarco et al. ............. 335/176 |
| 6,414,575 | B1 | * | 7/2002 | Swift ............................ 335/6 |
| 6,707,657 | B1 | * | 3/2004 | Powell ...................... 361/93.1 |
| 6,734,768 | B1 | * | 5/2004 | Kim ............................. 335/6 |
| 2003/0193381 | A1 | * | 10/2003 | Davidson et al. ............. 335/14 |

FOREIGN PATENT DOCUMENTS

DE 1191030 4/1965

(Continued)

OTHER PUBLICATIONS

Heinz Aeschbacher, "Der Flugsimulator", Technische Rundschau 1961, No. 39 (see translation of German Office Action).

*Primary Examiner*—Lincoln Donovan
*Assistant Examiner*—Bernard Rojas
(74) *Attorney, Agent, or Firm*—Davidson, Davidson & Kappel, LLC

(57) ABSTRACT

The invention relates to a simulation switch for incorporation into a flight simulator and to the simulation of an excess-current circuit breaker which can be manually actuated using an actuating element (10). The inventive simulation switch comprises a switching mechanism that is identical to the switching mechanism of the excess-current circuit breaker (9) for opening and closing a switching contact (2, 4), in addition to an electromagnetic release device (20) for releasing the closed switching contact (2, 4) by means of a control current (i).

19 Claims, 12 Drawing Sheets

FOREIGN PATENT DOCUMENTS

| | | |
|---|---|---|
| DE | 1802115 | 5/1969 |
| DE | 2809754 | 10/1978 |
| DE | 8904064 | 6/1989 |
| DE | 8904065 | 6/1989 |
| DE | 9208010 | 10/1993 |
| FR | 2512584 | 3/1983 |
| WO | WO 9113454 A1 * | 9/1991 |

* cited by examiner

SIMULATION SWITCH

BACKGROUND

The invention relates to a simulation switch for incorporation into a flight simulator and to the simulation of an excess-current circuit breaker which can be manually actuated using an actuating element.

Flight simulators are used to train pilots since dry runs on land are first needed so that the pilots can master the complexity of modern cockpits before they are allowed to practice in an actual airplane. In such a flight simulator, all of the operating and display elements found in an actual cockpit have to be available in an identical version, at least in the interface to the pilot, in order to convey the most realistic impression possible.

Thus, the simulation switches used in the flight simulator to simulate the circuit breakers of the type known, for example, from German Published Examined Application No. DE-AS 1 191 030 or German Utility Model Nos. DE-GM 8 904 064 and 89 04 065, all three of which are herewith incorporated by reference herein, have to be the same as those that are present to safeguard the power circuits in the actual airplane. In this context, the feel of the mechanical switching when the simulation switch is manually actuated must not differ from the feel of the switching during the manual actuation of a circuit breaker found in an actual airplane. For this reason, the same circuit breakers are installed in the flight simulator that are also used in the actual airplane. However, since the circuit breakers used in the flight simulator do not have to safeguard any actual power circuits, thermal circuit breakers are used whose rated current is as low as possible (typically 200 to 500 mA) so that this circuit breaker can be systematically released with the smallest possible currents and thus with the lowest possible dissipation power. Nevertheless, the necessary release currents are in the ampere range. This leads to relatively high energy values ($\sim i^2 t$) to actuate the simulation switch, as a result of which the supply network of the flight simulator has to be dimensioned accordingly. Moreover, due to the thermal release, the release times are in the range of seconds. This has to be taken into account by correspondingly long actuation times in the software used for the flight simulator in order to simulate the actual release times for every possible operational case or malfunction state.

SUMMARY OF THE INVENTION

An object of the present invention is to provide a simulation switch for incorporation into a flight simulator and to provide a simulation of an excess-current circuit breaker which can be manually actuated using an actuating element, whereby the above-mentioned drawbacks are largely avoided.

The present intention provides a simulation switch for a flight simulator for simulating an excess-current circuit breaker manually actuatable using an actuating element. The simulation switch includes a switching mechanism configured for opening and closing a switching contact, the switching mechanism being the same as a switching mechanism of the excess-current circuit breaker. Also included is an electromagnetic release device configured for releasing the switching contact using a control current when the switching contact is closed.

The simulation switch according to the invention comprises a switching mechanism that is the same as the switching mechanism of the excess-current circuit breaker for opening and closing a switching contact as well as comprising an electromagnetic release device for releasing the closed switching contact by means of a control current. Through this measure, on the one hand, the mechanical feel of the switching is not different from that of an excess-current circuit breaker used in an actual on-board network. Since the release of the simulation switch, that is to say, the opening of the switching contacts and the unlocking of the actuation element are effectuated by an electromagnetic release device, on the other hand, small control currents are sufficient to make the simulation switch respond. Moreover, through the use of an electromagnetic release device, the release time can be markedly reduced as compared to thermally released simulation switches. Thus, the control current needed for the release at a typical control voltage of 28 V lies in the order of magnitude of about 100 mA and the actuation time needed is less than 10 ms. Consequently, the actuation energy required drops by a factor of 500 to 1000 in comparison to the actuation energy required with the prior-art simulation switches involving thermal release.

In an advantageous embodiment, the electromagnetic release device is electrically connected in series to the switching segment formed by the switching contacts. Through this measure, the control current needed for actuating the electromagnetic release device switches off automatically when the switching contacts are opened, thus avoiding an overload of the release device.

In particular, the electromagnetic release device comprises a relay with a pull armature for unlocking a latching mechanism that is operative in the closed position of at least one of the switching contacts, whereby the coil of the relay is preferably connected in series to the switching segment.

In another preferred embodiment of the invention, a protective diode is connected in parallel or in series to the winding of the coil of the relay. In this manner, the harmful voltage effects on the control electronics when the coil inductivity is switched off are limited.

In another preferred embodiment of the invention, the simulation switch contains at least one electric housing-external connection contact that can be inserted with an internal contact part into the fully assembled housing, where it is affixed in the inserted state and is in electric contact with a housing-internal connection contact via the internal contact part. In this manner, different connection modalities, e.g. a plugged connection, soldered connection, screwed connection or wire-wrap connection, can be provided with just one single type of switch. The simulation switch can then be supplied without connection contacts. The various connection modalities can then subsequently be inserted into the fully assembled housing by the customers as a function of their specific requirements. Such final assembly by the customers is advantageous both in terms of production and storage.

Preferably, the electric contact between the housing-internal connection contact and the housing-external connection contact is independent of the mechanical fixation of the housing-external connection contact. As a result, a mechanical load on the housing-external connection contact does not have a detrimental effect on the electric contact.

In particular, the housing-internal connection contact consists of a contact spring mounted in the housing, whereby preferably the contact force acts perpendicular to the direction of insertion. This ensures that a load on the housing-external connection contact does not cause an impermissible reduction of the contact force.

Preferably, a latch connection is provided for the mechanical fixation of the housing-external connection contact. This makes it especially easy for the buyer to assemble it.

In another especially preferred embodiment of the invention, the simulation switch, in addition to the electromagnetic release device, has a thermal excess-current release device for releasing the closed switching contact with an excess current that flows through it. Due to this measure, the simulation switch can be used as a conventional excess-current circuit breaker and also as a simulation switch. Furthermore, a simulation switch that has been augmented by this functional feature offers the possibility of remote release with a control current, which allows the switch to be opened even before reaching the excess current that is normally needed for the release. Such a simulation switch can then advantageously also be used in actual airplanes in which an error condition is detected by means of additional error diagnostic means, even before the excess current is reached. For example, when a microprocessor-operated control means is used, switching off is possible even before the critical excess current is reached. Such a circuit breaker can be advantageous especially for use in systems that allow an error analysis and a recognition of an error condition even before critical states that places a burden on the system are reached.

For this purpose, the switching contacts are preferably associated with connection contacts that are electrically separated from the connection contacts of the electromagnetic release device. An excess-current circuit breaker configured in this manner then has four connection contacts and entails two release devices that are independent of each other and that can possibly respond to different errors.

BRIEF DESCRIPTION OF THE DRAWINGS

For a further elucidation of the invention, reference is made to the embodiments depicted in the drawings. The following are shown.

DETAILED DESCRIPTION

Figure 1:
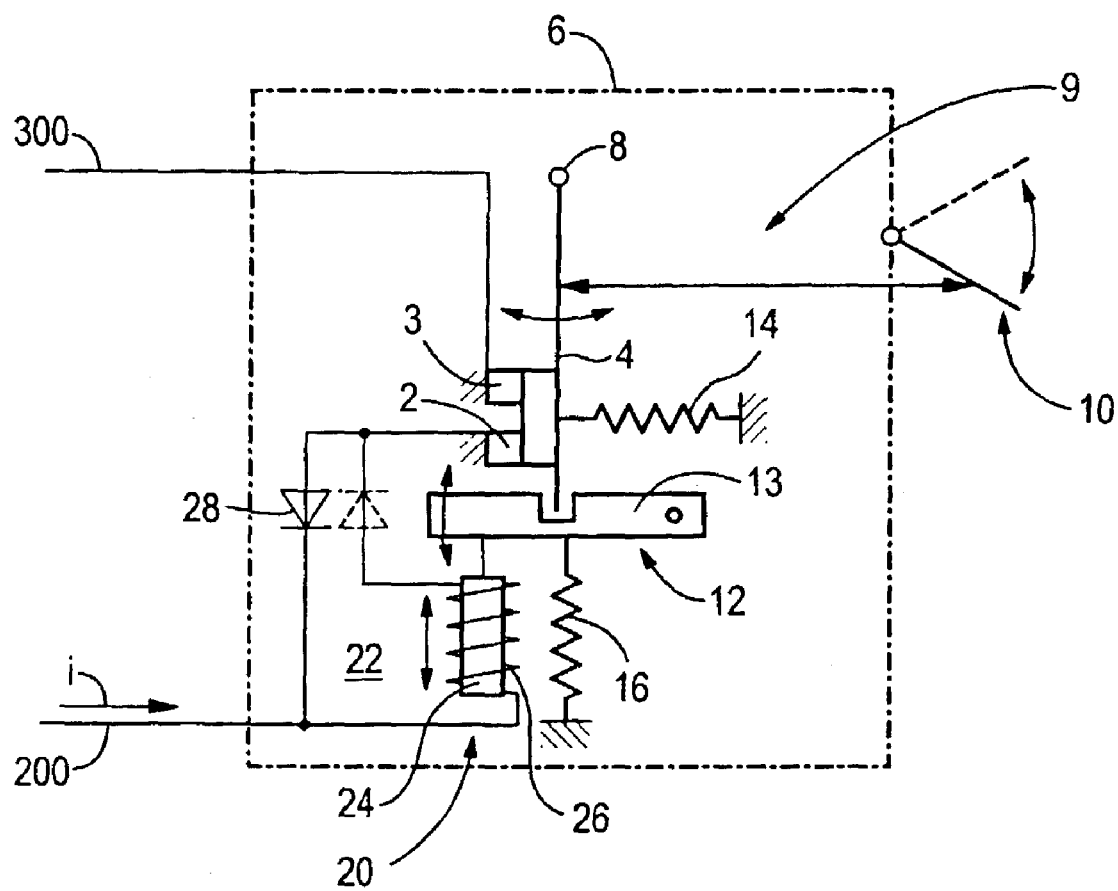
FIG. 1—a simulation switch according to the invention in a schematic diagram that illustrates the essential functions, FIG. 2—a simulation switch in an overall perspective view, FIG. 3—a longitudinal section of the simulation switch according to FIG. 2 with closed switching contacts, FIG. 4—the simulation switch according to FIG. 3 in the released state, FIG. 5—an exploded view of the electromagnetic release device of the simulation switch, FIGS. 6 and 7—an alternative embodiment with pluggable connection contacts in the closed and opened states, respectively, FIG. 8—an exploded view of the release device of this alternative embodiment, FIG. 9—the latching of the pluggable connection contacts in the housing of the simulation switch, FIG. 10—a simulation switch having pluggable connection contacts, in which the protective diode is connected in series to the relay of the electromagnetic release device, FIG. 11—another embodiment of a simulation switch according to the invention with a laterally positioned electromagnetic release device, and FIG. 12—a simulation switch in which the switching contacts can be released with an excess current as well as using the electromagnetic release device.

According to FIG. 1, a simulation switch according to the invention comprises a first and a second stationary switching contact 2 and 3 respectively as well as a movable switching contact (contact bridge) 4. The movable switching contact 4 is mounted in a housing 6—only indicated symbolically in the drawing—so as to pivot around a pivoting axis 8 and so as to be mechanically coupled via a switching mechanism (switching lock) 9 to an actuation element 10, which is a rocker switch in this embodiment.

The movable switching contact 4 in the embodiment is configured as a contact bridge that bridges the stationary switching contacts 2, 3. The stationary switching contacts 2, 3 are electrically connected to housing-external connection contacts 200, 300. Instead of using a contact bridge as the movable switching contact 4, it is fundamentally also possible to movably mount one or both of the switching contacts that are directly contacted with the connection contacts 200, 300.

The movable switching contact 4 is operatively connected to a latching mechanism 12, shown in the schematic diagram, by way of example, as a pivoting bar 13 that holds the switching contacts 2, 3, 4 in the closed position against the action of a first spring 14, depicted symbolically as a tension spring in the schematic diagram of the figure. For this purpose, under the action of a second spring 16, for example, shown as a pressure spring, the bar 13 latches with the movable switching contact 4 when the latter is in contact with the stationary switching contacts 2, 3 and bridges the switching segment between these switching contacts 2, 3.

The bar 13, in turn, is operatively connected to an electromagnetic release device 20, with which said bar can be swiveled, for example, against the action of the second spring 16, so that the latching mechanism 12 of the movable switching contact 4 is unlocked and it opens or is released by the action of the spring force exerted by the tension spring 14, at the same time releasing the actuation element 10 (position indicated by a broken line).

For this purpose, the electromagnetic release device 20 comprises a relay 22 whose pull armature 24 is non-positively connected to the bar 13. When a control current i is applied to the coil 26 of the relay 22, the pull armature 24 is attracted, the latching mechanism 12 between the movable switching contact 4 and the bar 13 is unlocked and the contact is opened. The coil 26 is electrically connected in series to the switching segment formed by the switching contacts 2, 3, 4, so that the control circuit for the relay 22 is automatically interrupted when the contact is opened. A protective diode 28 is connected in parallel or in series (indicated by a broken line) to the coil 26. This imparts polarity to the relay, i.e. it can only be operated in one current direction.

Figure 2:
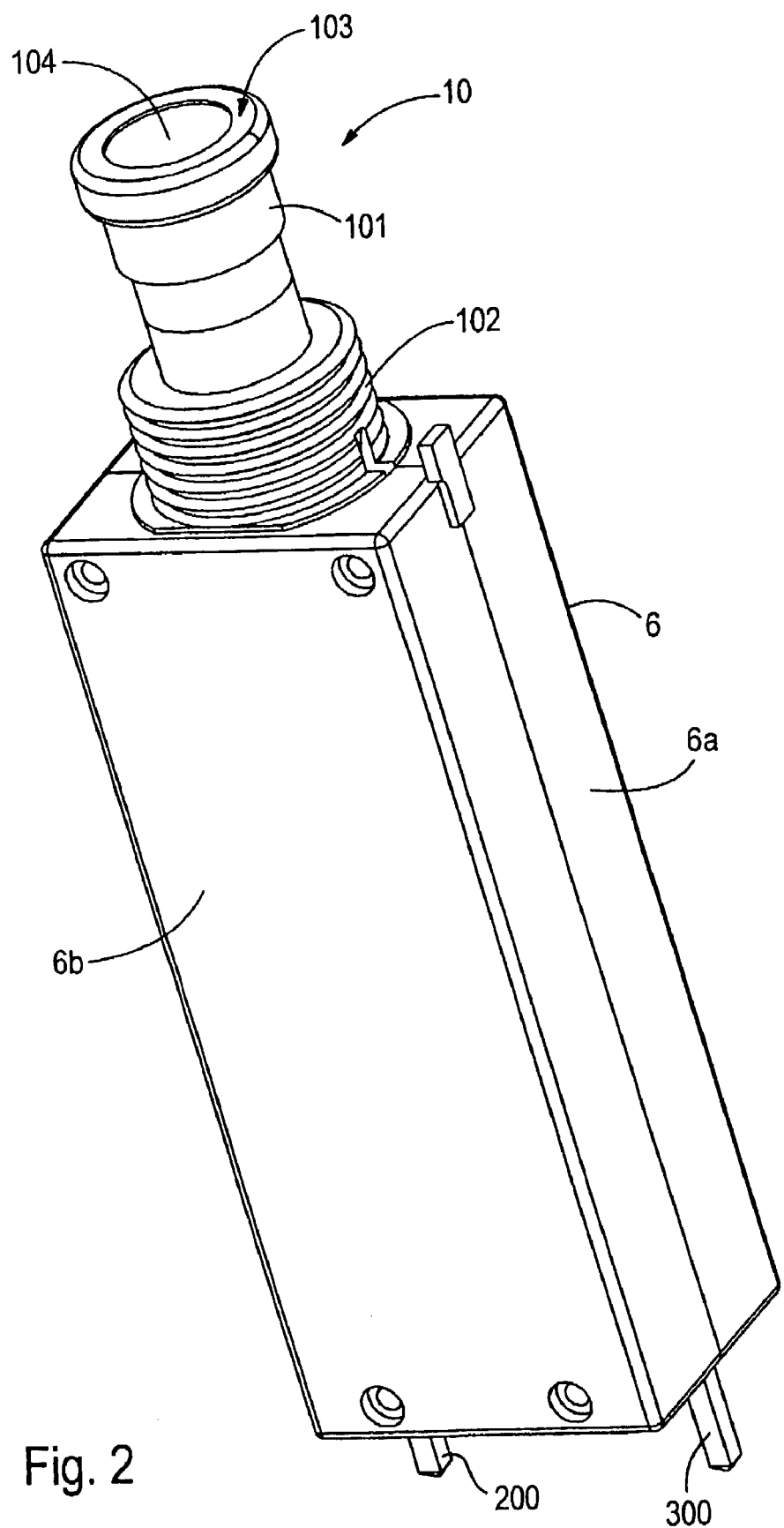

As shown in FIG. 2, in a simulation switch according to an embodiment of the invention, a pushbutton 101 is provided as the actuation element 10. The pushbutton 101 is inserted into a guide sleeve 102 that is provided with an external thread and that concurrently serves to attach the simulation switch to a control panel. The face 103 of the pushbutton 101 is provided with circular depression 104 that serves as a writing surface for an adhesive label indicating a desired rated current strength that is to be simulated.

The housing 6 preferably consists of two housing halves 6a and 6b made of thermoplastic material. The housing-external connection contacts 200, 300—one of which is connected to the coil and the other to one of the switching contacts and which are configured as wire-wrap connections in this embodiment—project from the housing 6.

Figure 3:
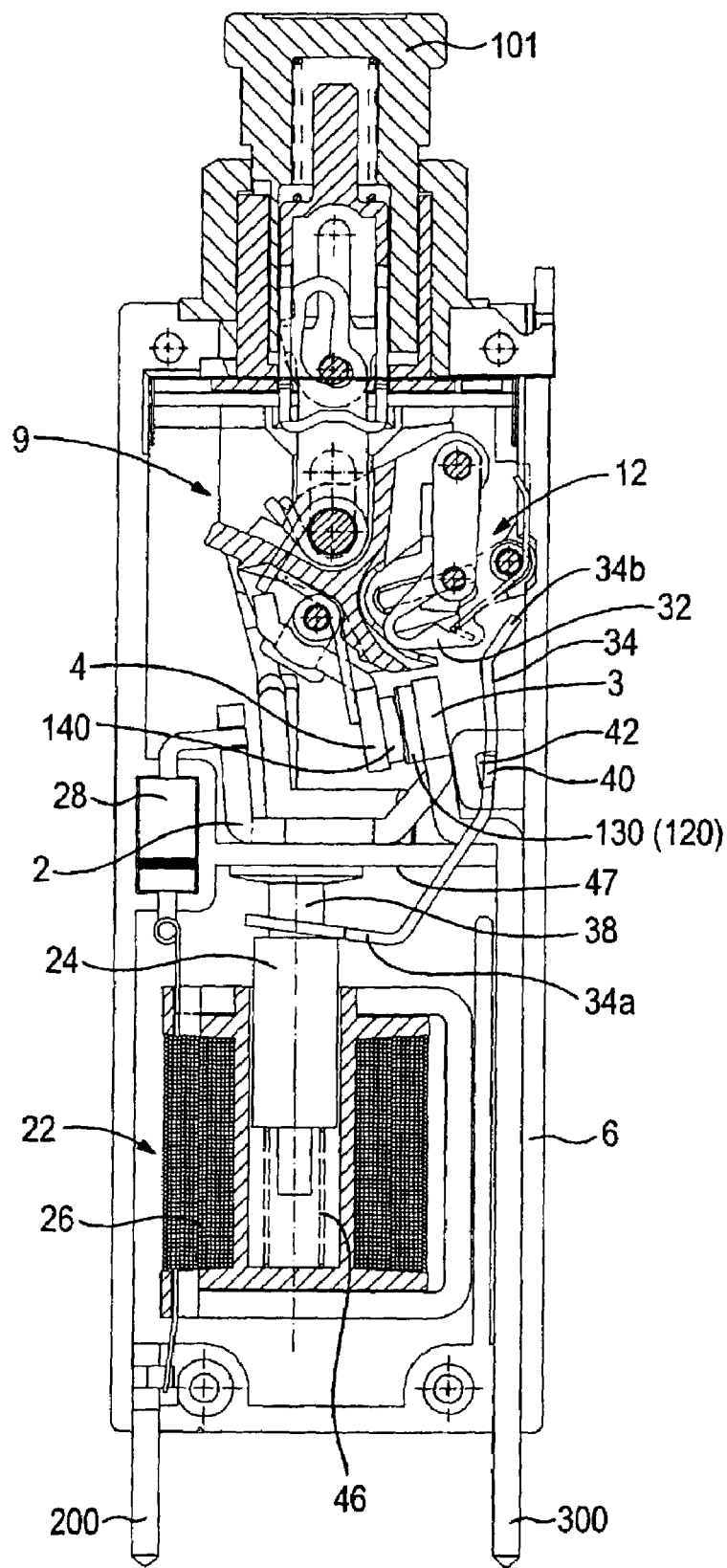

FIG. 3 shows the simulation switch in the closed state, i.e. the pushbutton 101 is pushed in and the movable switching contact 4 is pressed with its contact piece 140 against the stationary switching contacts 2, 3, whereby in the figure, the contact piece 120 of the approximately U-shaped first stationary switching contact 2 is covered by the contact piece 130 of the second stationary switching contact 3.

The switching mechanism 9 shown in the embodiment is identical to the switching mechanism of the excess-current circuit breaker disclosed in German Utility Model Nos. 89 04 065 and 89 04 064, where it is explained in depth in terms of its structure and mode of operation.

A latching lever 32 that holds the movable switching contact 4 in the closed position serves as the latch 12. The latching lever 32 is associated with a releasing lever 34 which, when actuated, causes the latching lever 32 to pivot and the switching contacts 2, 3, 4 and thus the switching segment between the switching contacts to open.

In order to actuate the releasing lever 34, unlike with the excess-current circuit breaker disclosed in the above-mentioned utility models, the pull armature 24 of the relay 22 is provided instead of a bimetal. For this purpose, the releasing lever 34 has a fork-shaped free end 34a that faces away from the latching lever 32 and that engages in a ring-shaped recess 38 on the essentially cylindrical pull armature 24. The releasing lever 34 is held in place by means of lateral bearing journals 40 so as to pivot in the corresponding bearing lugs 42 of the housing 6.

In the figure, it can also be seen that the winding of the coil 26 is connected via the protective diode 28 to the U-shaped first stationary switching contact 2 and is thus connected in series to the switching segment. In the switched-on state, the pull armature 24 is then under the influence of a pressure spring 46 in the starting position and leans against a housing-internal stop surface 47. In this starting position, the releasing lever 34 does not engage the latching lever 32. In this position, a small current in the milli-ampere range can flow between the connection contacts 200 and 300 which, although not sufficient for the release, allows the control electronics to ascertain the switching state (closed or open contact).

Figure 4:
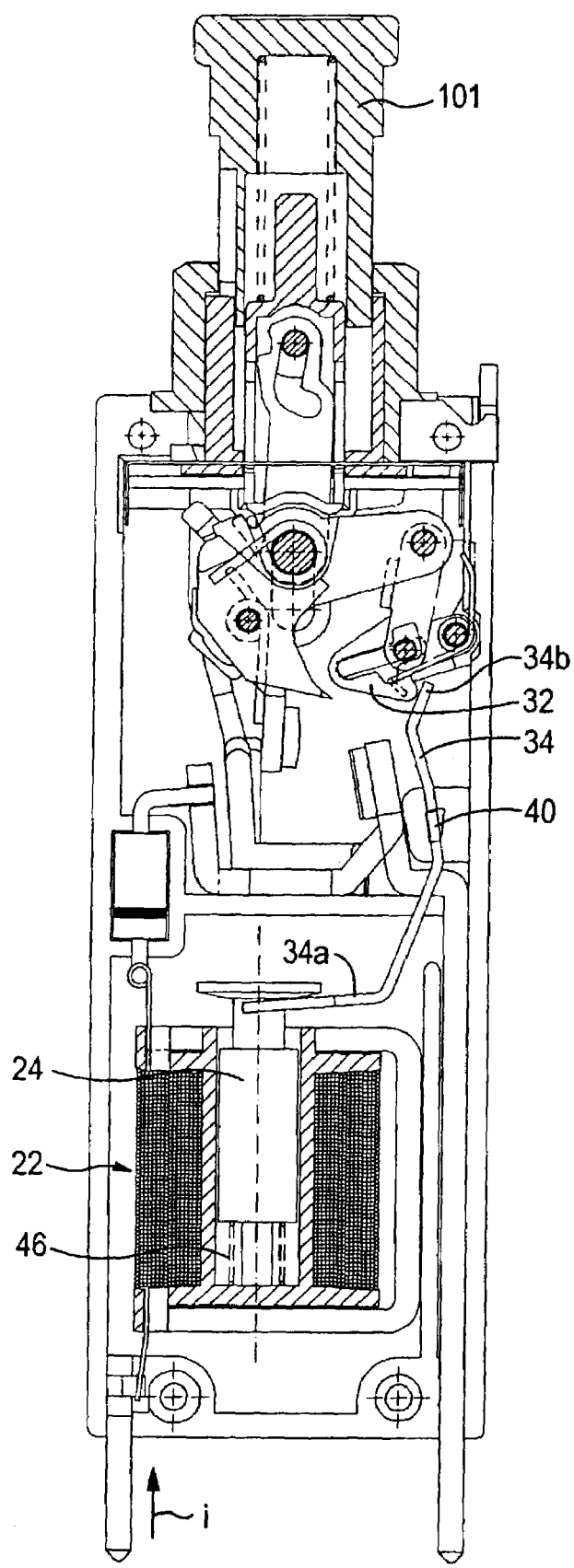

If an adequately large control current i flows through the winding of the coil 26, then according to FIG. 4, the pull armature 24 is pulled against the action of the pressure spring 46 into the inside of the coil 26, causing the releasing lever 34 to pivot around the pivoting axis that is defined by the bearing journals 40 perpendicular to the drawing plane. With its free end 34b associated with the latching lever 32, the releasing lever 34 causes the latching lever 32 to pivot, unlocking the switching lock of the switching mechanism in the manner described in the utility models referenced above. As a result, the movable switching contact 4 moves away from the stationary switching contacts 2, 3 and the pushbutton 101 pops out.

The state shown in FIG. 4 does not depict the final state but rather a state during the opening of the contacts. Once the switching contacts 2, 3, 4 are opened, the relay 22 becomes current-free and the pull armature 24 returns to its starting position so that the releasing lever 34 likewise pivots back to its starting position shown in FIG. 3.

The switching mechanism explained in depth in the utility models involves a release procedure, i.e. the connection made by the movable switching contact 4 between the stationary switching contacts 2, 3 is also interrupted when the pushbutton 101 is held pressed down.

Figure 5:
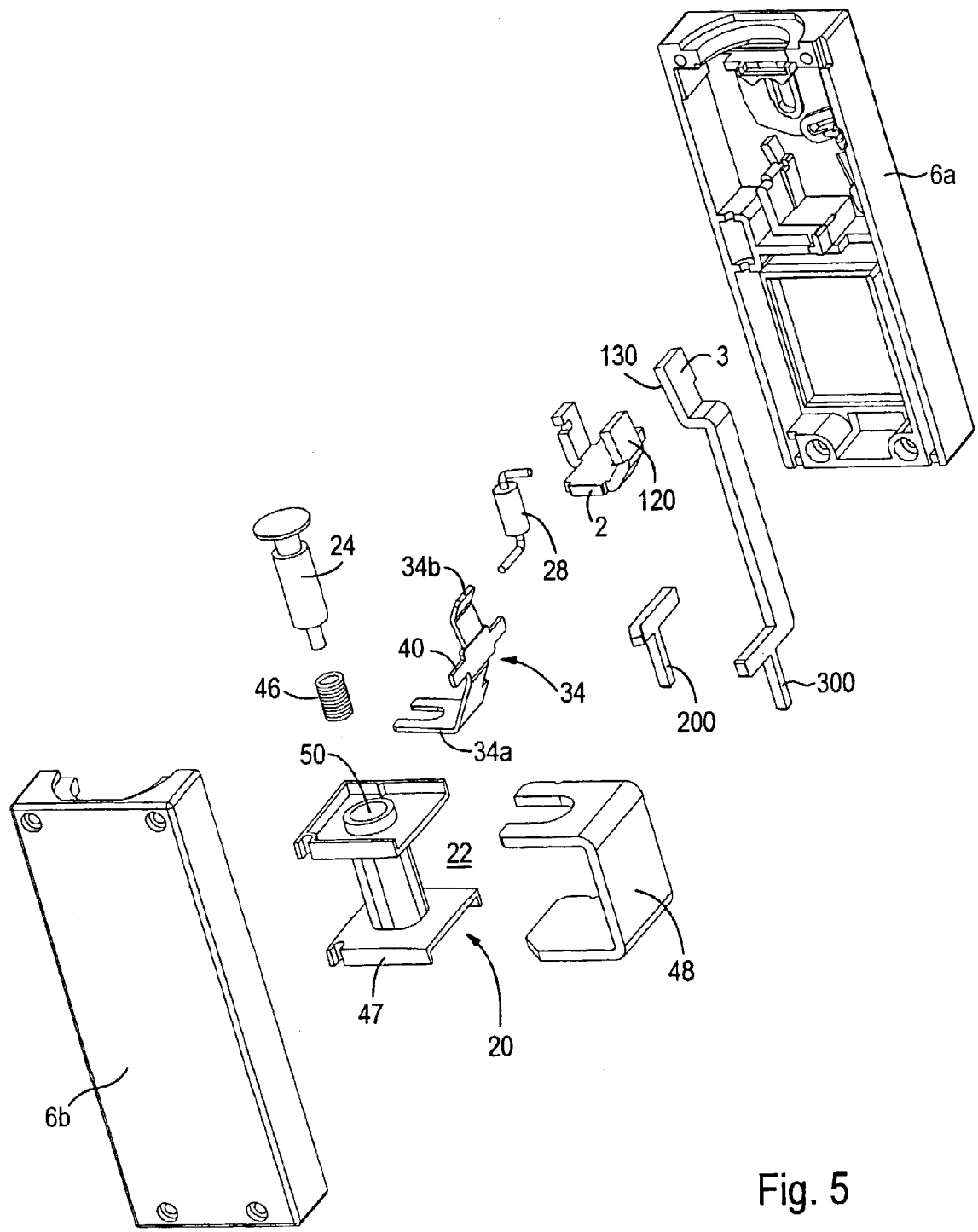

FIG. 5 shows the functional parts of the electromagnetic release device 20 in an exploded view. The relay 22 comprises a coil holder 47 onto which a U-shaped magnet yoke 48 has been slipped. The releasing lever 34, whose free end 34a is fork-shaped, consists of a punched curved part onto which the bearing journals 40 are shaped in one piece. The pressure spring 46 on which the pull armature 24 is mounted is inserted into a hollow-cylindrical guide borehole 50 in the lengthwise direction of the coil holder 47. The figure also shows that the second stationary switching contact 3 and the associated housing-external connection contact 300 are made in one piece. Likewise depicted is the U-shaped design of the first stationary switching contact which is connected to the protective diode 28 and whose contact piece 120 in the assembled state is arranged in one plane with the contact piece 130 of the second stationary switching contact 3.

Figure 6:
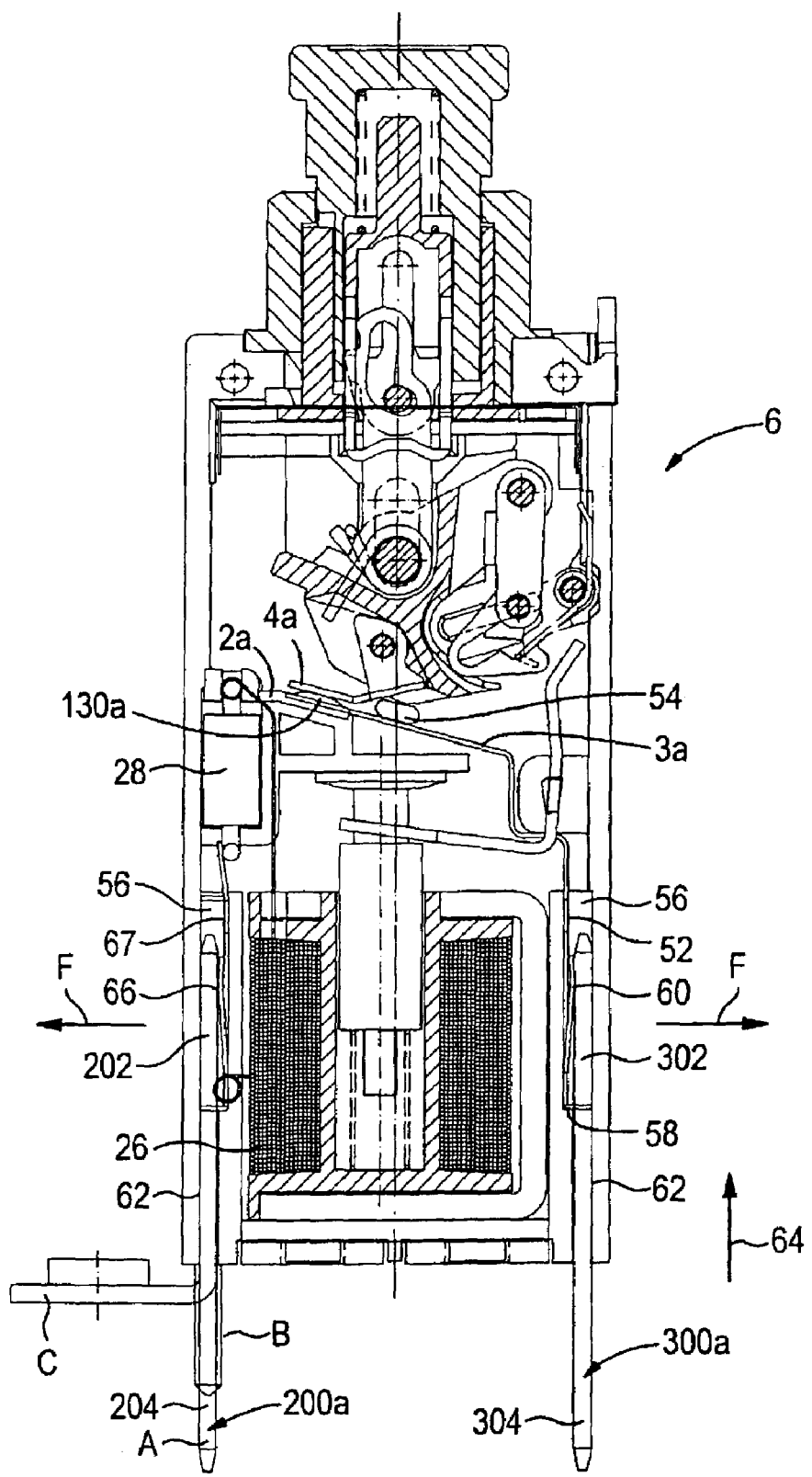

The alternative embodiment according to FIG. 6 has a stationary switching contact 3a whose free end 52 facing away from the contact piece 130a is mounted in a recess 56 inside the housing 6. The switching contact 3a is clamped in the housing 6 between a support journal 54 of the inner wall of the recess 56, said journal being shaped onto the housing 6. For this purpose, its free end 52 is provided with an L-shaped angled support foot 58 that rests in the recess 56. In the area of the recess 56, the free end 52 of the stationary switching contact 3a has a projecting spring element 60, in the example a spiral spring, which projects into the recess 56 and which, when the switching contact 2a is fixed inside the recess 56, can be moved against the spring force.

An insertion channel 62 opens up into the recess 56 and a housing-external connection contact 300a with its internal contact part 302 is inserted into said channel, whereby the spring element 60 presses against said part, thereby establishing an electric contact between the housing-external connection contact 300a and the stationary switching contact 3a. The contact force F between the spring element 60 and the internal contact part 302 of the connection contact 300a acts parallel to the drawing plane and perpendicular to the direction of insertion 64 or to the lengthwise direction of the insertion channel 62. Consequently, a mechanical load on the external contact part 304 of the connection contact 300a in this insertion or introduction direction 64 has no effect on the contacting since the contact force F acts perpendicular to the direction of insertion. Since the internal contact part 302 lies against the inner wall due to the staggered arrangement of the insertion channel 62, which is narrower across from the recess 56, as well as due to the action of the spring element 60, a perpendicular load of the connection contact 300a leads either to an increase of the contact force F or leaves it practically unaffected.

For purposes of mechanical fixation in the housing 6, the connection contact 300a is provided with catch recesses that engage with catch lugs that are arranged correspondingly in the housing 6.

In a similar manner, the protective diode 28 and the winding of the coil 26 are contacted on the identically designed housing-external connection contact 200a with a contact element 66 that is likewise mounted in a recess 56 having the same shape. Here, in the area of the recess 56, the contact element 66 is identical to the free end 52 of the switching contact 2a and it is electrically contacted in the same manner with the internal contact part 202. With its free end 67, the contact element 66 is connected to a connection contact of the protective diode 28. In this embodiment, the protective diode 28 is connected in parallel to the winding of the coil 26. For this purpose, the connection ends of the coil winding are contacted to a connection tab of the contact element 66 or to another connection contact of the protective diode 28.

The figure also shows that different embodiments A, B, C can be provided as housing-external connection contacts whose external contact parts 204, 304 are designed differently and that are subsequently inserted into the simulation switch that was delivered without connection contacts, that is to say, only by the user as a function of his/her requirements.

Figure 7:
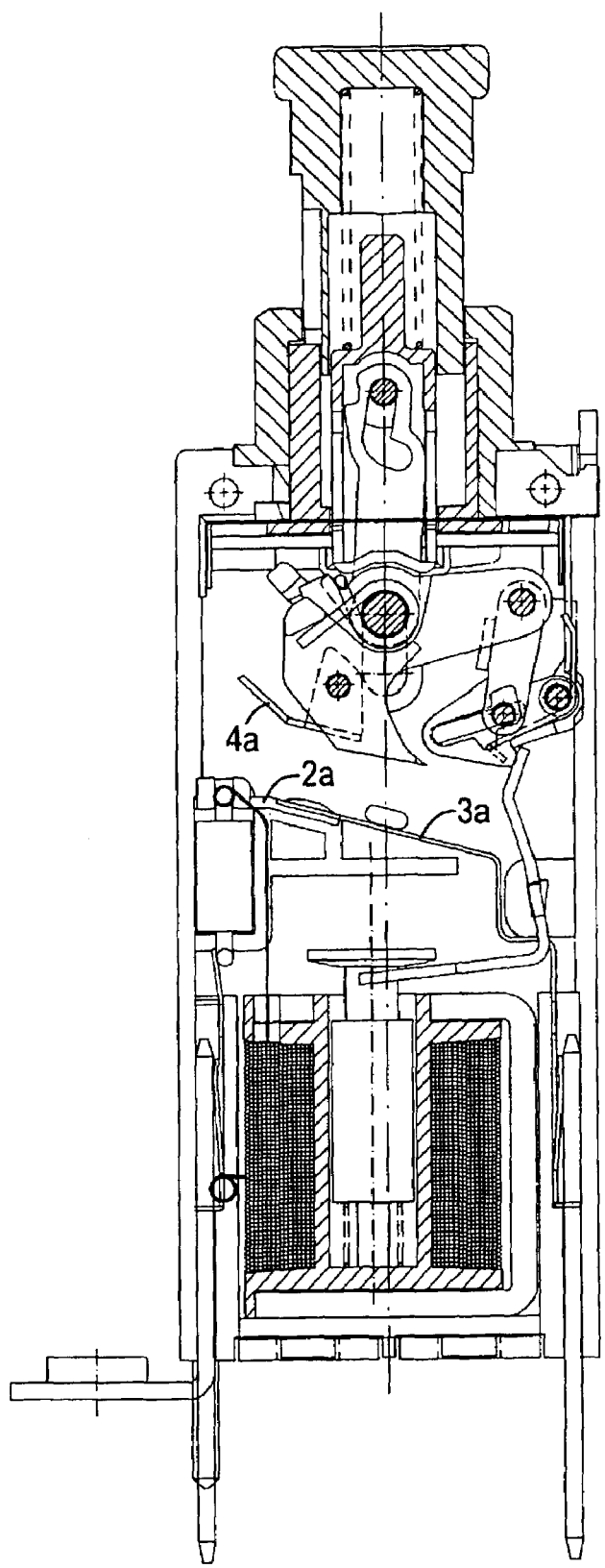

FIG. 7 shows the simulation switch according to FIG. 6 in the released state, whereby in this embodiment, the movable switching contact 4a is pivoted away in an upwards movement.

Figure 8:
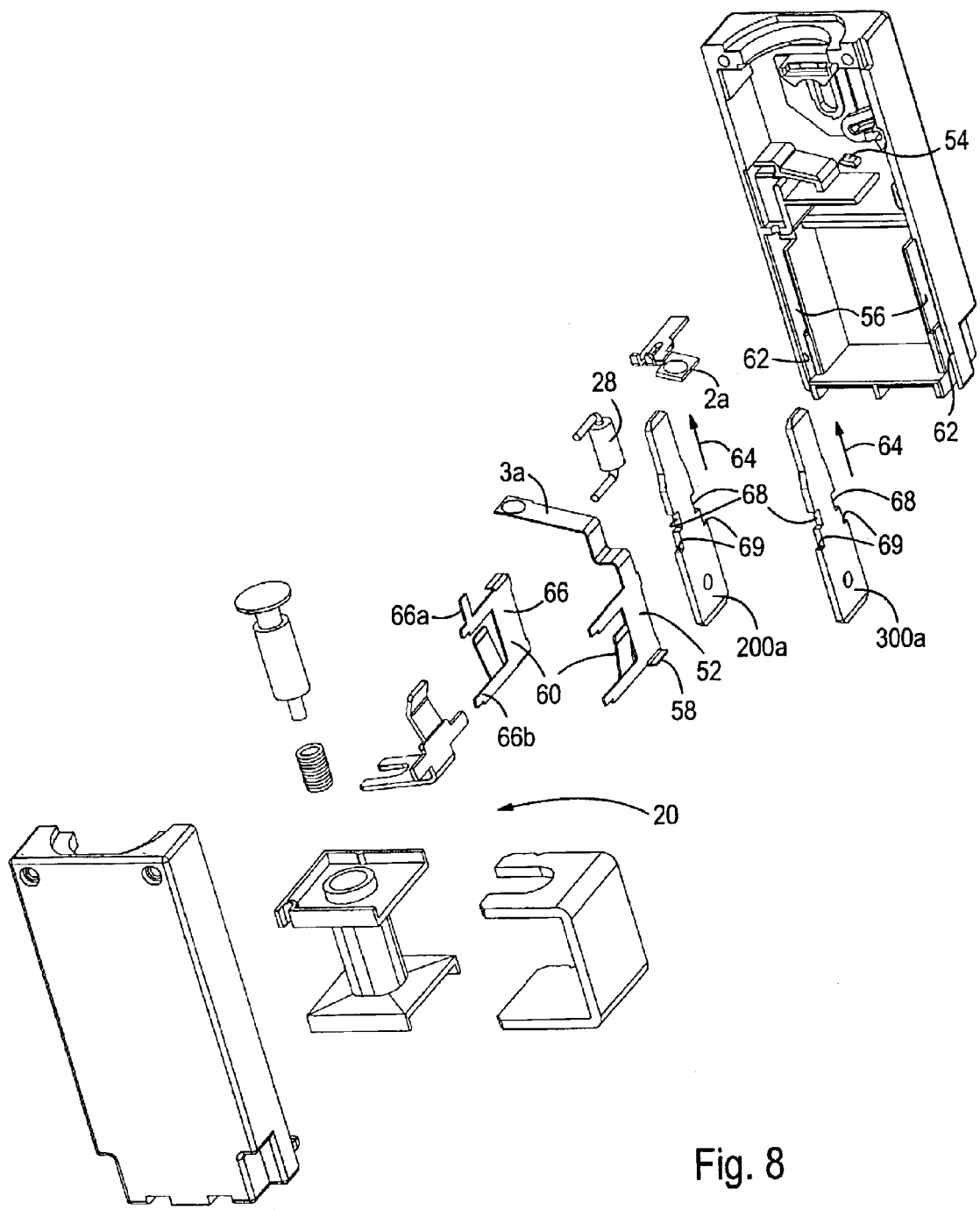

The exploded view according to FIG. 8 shows the second stationary switching contact 3a and the contact element 66—which is connected via the protective diode 28 to the first stationary switching contact 2a—as well as the spring element 60 that is shaped in one piece onto each of them. The contact element 66 is provided with a contact tongue 66a that is soldered to a connection contact of the protective diode 28. Another connection tab 66b is provided for soldering to the connection contact of the coil winding.

The housing-external connection contacts 200a, 300a are provided on their narrow sides with catch recesses 68 that engage in corresponding projections (catch lugs) in the housing 6 and that secure the connection contacts 302a, 303a in interaction with stop shoulders 69 against axial shifting. The contact force F exerted by the spring element 60 acts perpendicular to the direction of insertion 64 and is uncoupled from the mechanical holding force.

Figure 9:
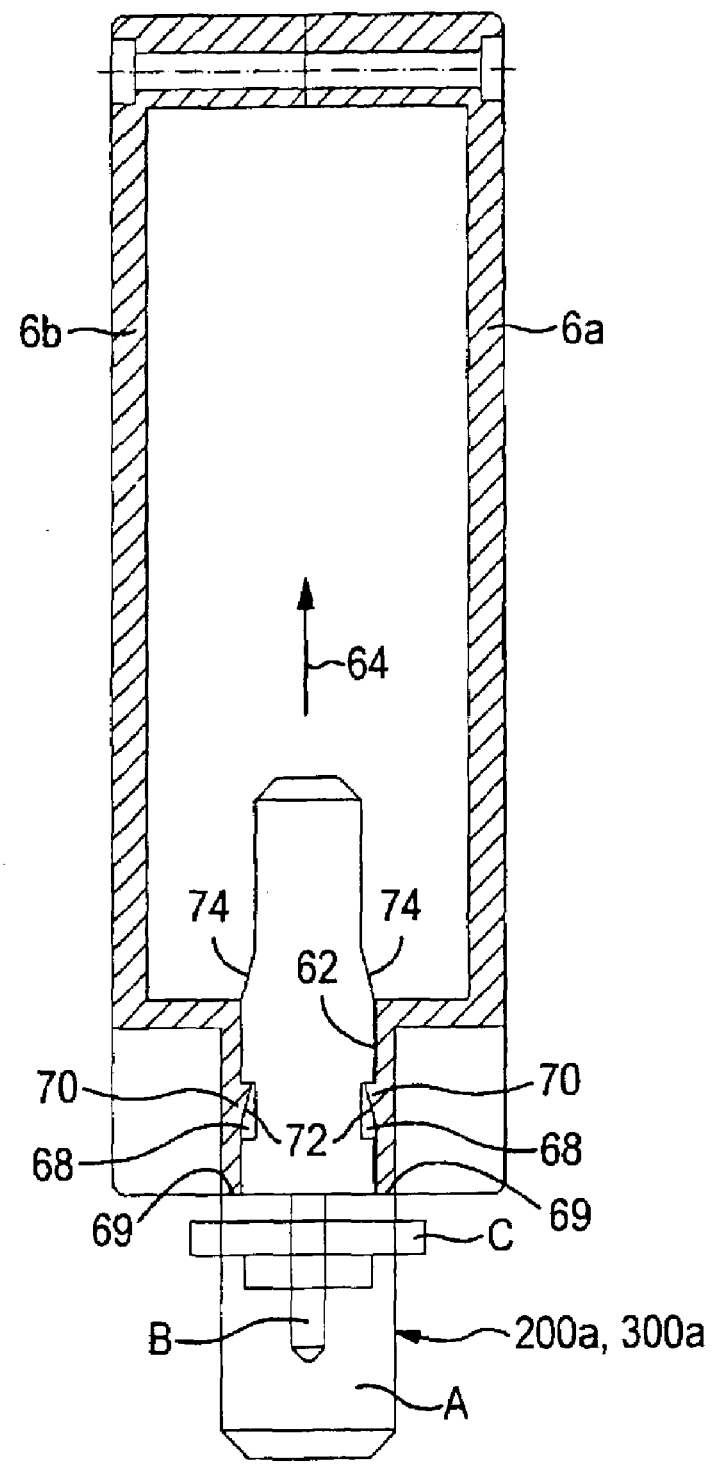

According to FIG. 9, on the side walls of the insertion channel 62, there are catch lugs 70 that are provided with a gliding bevel 72 in the direction of insertion 64. The connection contact 200a (300a) is tapered in the direction of insertion 64 and likewise provided with a slanted segment 74 that slides on the gliding bevel 72 when the connection contact 200a (300a) is inserted into the insertion channel 62 and that pushes the side walls of the insertion channel 62 apart. In the end position of the connection contact 200a, 300a, the catch lugs 70 snap into the recesses 68 so that it is no longer possible for the connection contact 200a, 300a to be pulled out or to fall out. In this position, the stop shoulder 69 rests on the edge of the insertion channel 62 so that the connection contact 200a, 300a is secured in both directions against axial shifting.

Figure 10:
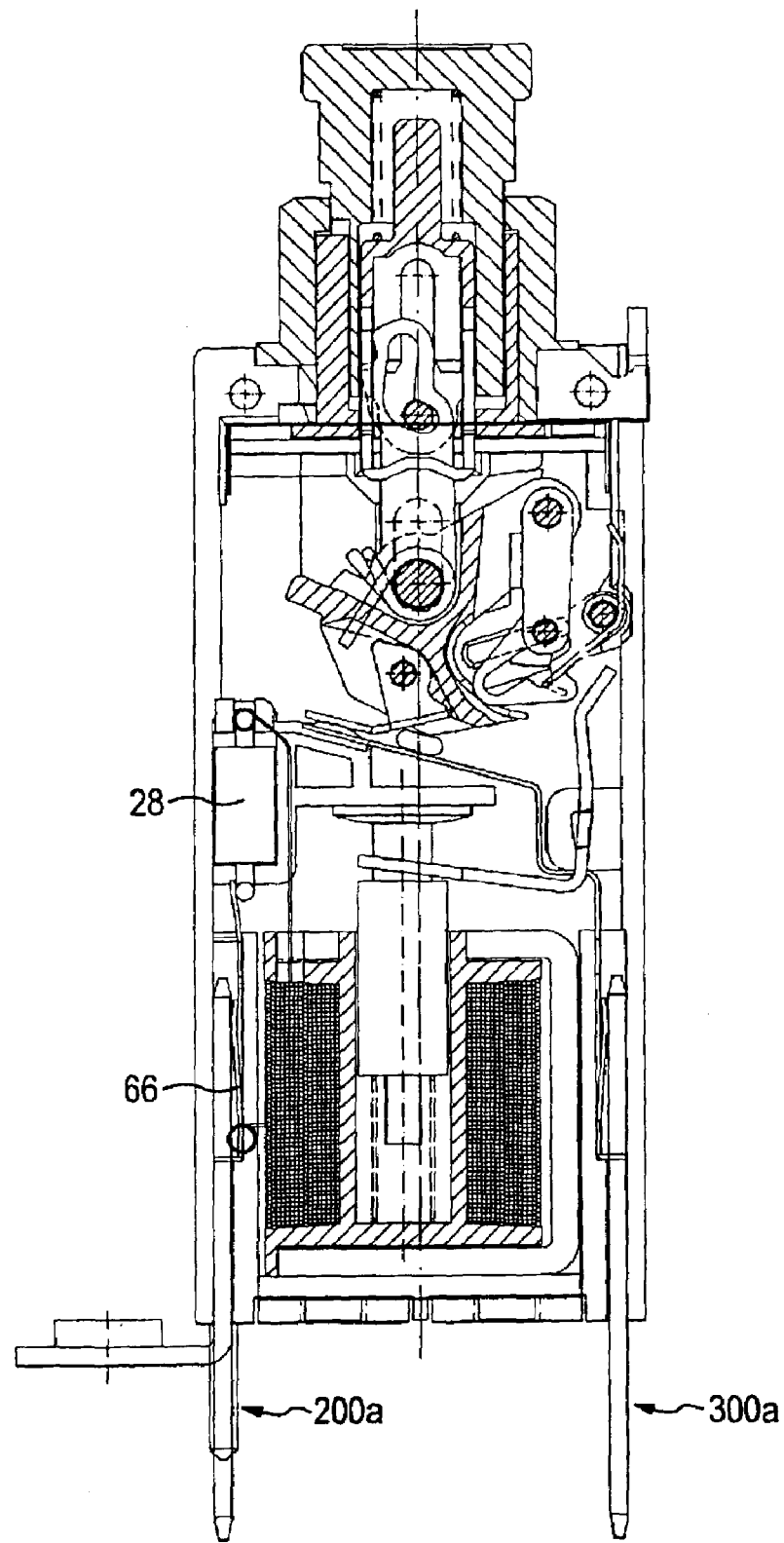

In the embodiment according to FIG. 10, in the case of a simulation switch having pluggable housing-external connection contacts 200a, 300a, the protective diode 28 is connected in series to the coil winding. For this purpose, the contact tongue 66a (FIG. 8) of the contact element 66 has been left out so that only its connection tabs are connected to the coil winding.

Figure 11:
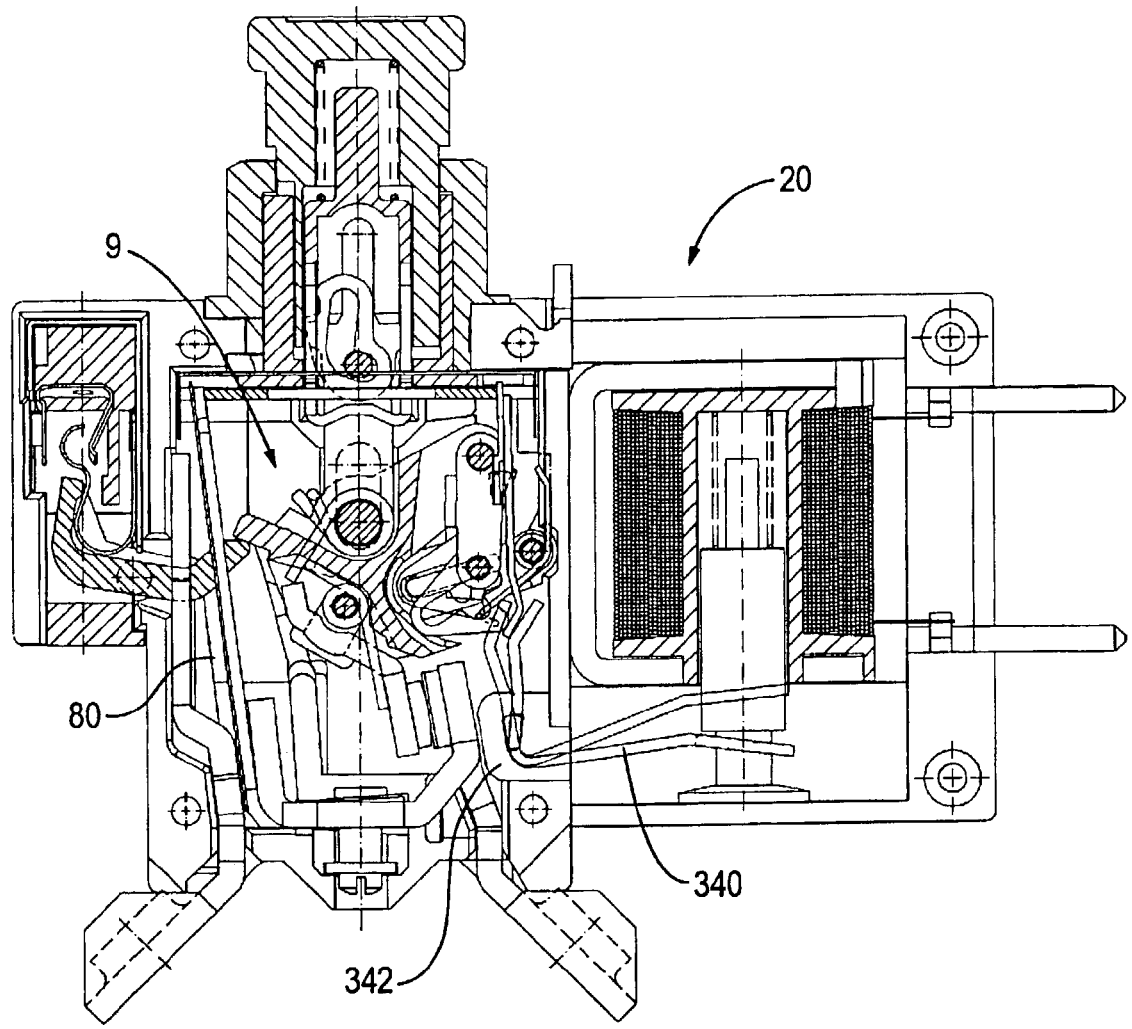

According to FIG. 11, the simulation switch is provided with an electromagnetic release device 20 as well as with a bimetal-controlled thermal excess-current release device 80 of the type disclosed, for example, in German Utility Model Nos. 89 04 065 and 89 04 064. The electromagnetic release device 20 and the thermal excess-current release device 80 are electrically uncoupled from each other.

Figure 12:
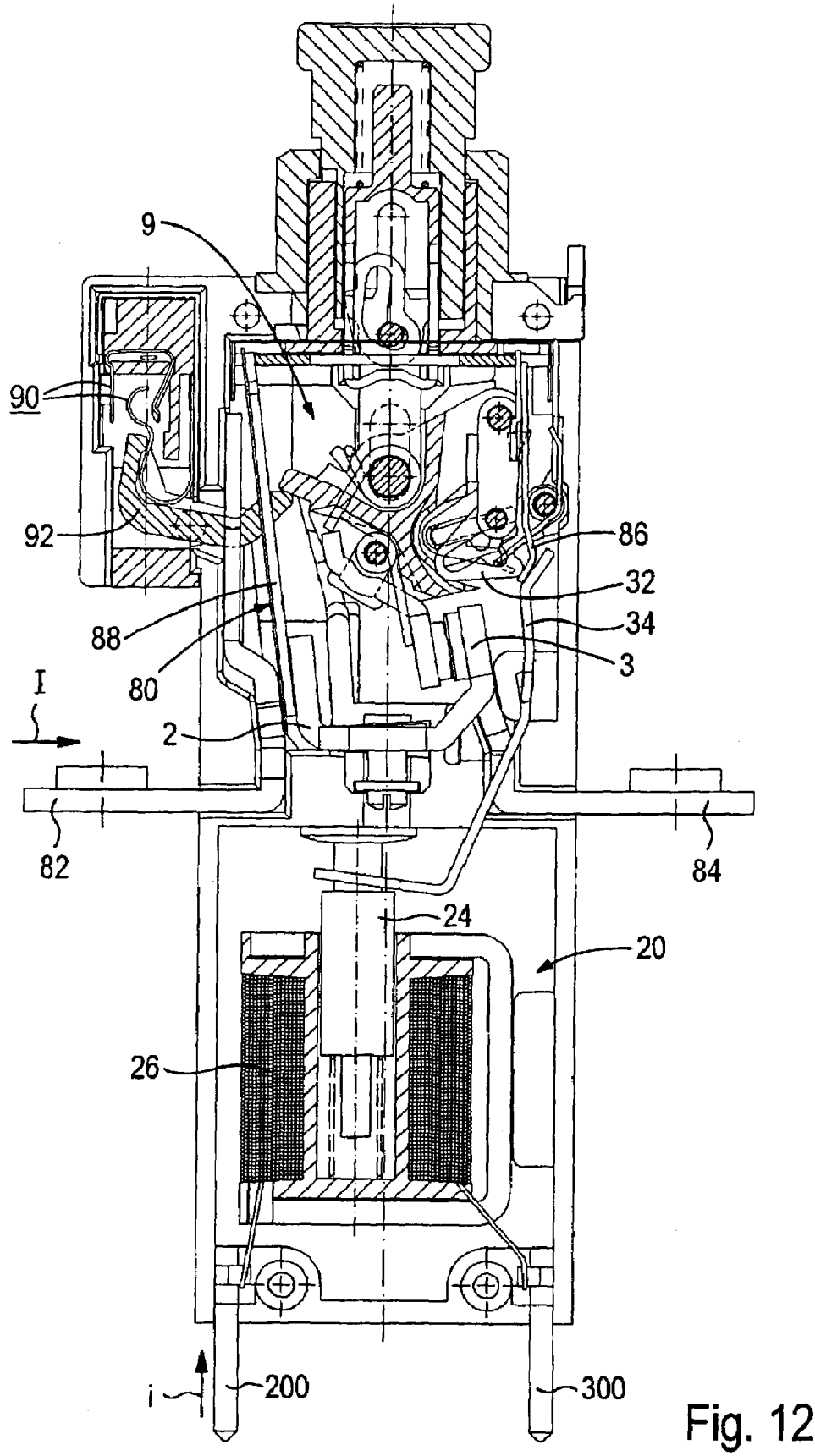

For this purpose, the simulation switch is provided with two additional connection contacts 82 and 84 (FIG. 12) to which the switching contacts 2, 3 are connected. The electromagnetic release device 20 is mechanically connected in series to the thermal excess-current release device 80, whereby between the releasing lever 34 anchored on the pull armature 24 and the latching lever 32, there is a second releasing lever 86 that is coupled to a bimetal 88 that serves as a thermal releasing element. In this embodiment, the simulation switch can be used as an actual excess-current circuit breaker with remote release, i.e. the release is effectuated either via an excess current I that flows through the connection contacts 80, 82 or via a control current i that flows to the coil 26.

In order for the switching state of the simulation switch to be ascertained, the switch is provided with an additional signal contact 90 that is actuated by a signal contact lever 92 that is operatively connected to the switching mechanism 9.

In the embodiment according to FIG. 11, the electromagnetic release device 20 is arranged next to the switching mechanism 9. For this purpose, the electromagnetic release device 20 is coupled to an L-shaped releasing lever 340 that is pivotally mounted at the intersection of its legs in a bearing trough 342. In the figure, this releasing lever 340 is shown in its two end positions.

Such an arrangement is especially advantageous when the available installation depth is limited and it is not possible to install a simulation switch in which the electromagnetic release device 20 is arranged below the switching mechanism 9, as shown in FIGS. 1 to 10 and FIG. 12.

The spatial arrangement of the electromagnetic release device 20 shown in the embodiment with reference to a simulation switch having an additional excess-current release device 80 can also fundamentally be used for a simulation switch without an excess-current release device 80.

The invention claimed is:

1. A flight simulator comprising a plurality of simulation switches, each simulation switch configured to simulate a respective excess-current circuit breaker manually actuatable using an actuating element, each simulation switch including a respective switching mechanism configured to open and close a respective switching contact, the switching mechanism being the same as a switching mechanism of the respective excess-current circuit breaker, at least a first of the simulation switches including an electromagnetic release device configured to release the respective switching contact using a control current of the flight simulator when the switching contact is closed.

2. The flight simulator as recited in claim 1 wherein the electromagnetic release device is connected in series to a switching segment including the switching contact.

3. The flight simulator as recited in claim 1 wherein the electromagnetic release device includes a relay having a pull armature configured for unlocking a latching mechanism, the latching mechanism being operative in a closed position of the switching contact.

4. The flight simulator as recited in claim 3 wherein the electromagnetic release device is connected in series to a switching segment and wherein a coil of the relay is connected in series to the switching segment.

5. The flight simulator as recited in claim 3 wherein the pull armature is further configured for engaging the latching mechanism via a pivoting releasing lever.

6. The flight simulator as recited in claim 2 wherein the electromagnetic release device includes a relay and further comprising a protective diode connected in series or in parallel to a winding of a coil of the relay.

7. The flight simulator as recited in claim 1 wherein each simulation switch includes:
   a housing;
   a housing-internal connection contact disposed in the housing; and at least one housing-external connection contact including an internal contact part and being insertable into the housing so as to be mechanically held in the housing and in electrical contact with the housing-internal connection contact via the internal contact part.

8. The flight simulator as recited in claim 7 wherein the electric contact between the housing-internal connection contact and the housing-external connection contact is independent of the mechanical holding of the housing-external connection contact in the housing.

9. The flight simulator as recited in claim 7 wherein each simulation switch includes a latch connection configured for providing the mechanical holding of the housing-external connection contact in the housing.

10. The flight simulator as recited in claim 7 wherein the housing-internal connection contact includes a spring element.

11. The flight simulator as recited in claim 7 wherein a contact force of the housing-internal connection contact against the internal contact part is perpendicular to a direction of insertion of the housing-external connection contact.

12. The flight simulator as recited in claim 1 wherein each simulation switch includes a thermal excess-current release device configured for releasing the respective switching contact when the switching contact is closed and an excess current flows through the simulation switch.

13. The flight simulator as recited in claim 12 wherein the respective switching contact is associated with connection contacts which are electrically separated from connection contacts of the electromagnetic release device.

14. The flight simulator as recited in claim 1 wherein the control current is independent of an excess current of the excess current circuit breaker.

15. The flight simulator as recited in claim 1 wherein the control current is controlled by a control device.

16. The flight simulator as recited in claim 15 wherein the control device includes a microprocessor.

17. The flight simulator as recited in claim 1 wherein the electromagnetic release device is configured for remotely releasing the respective switching contact.

18. The flight simulator as recited in claim 1 wherein the respective switching contact is operatively connected to a latching mechanism configured to hold the switching contact in a closed position.

19. The flight simulator as recited in claim 18 wherein the latching mechanism is operatively connected to the electromagnetic release device and a releasing of the latching mechanism releases the actuation element.

* * * * *